US012343962B2

(12) United States Patent
Murashige et al.

(10) Patent No.: US 12,343,962 B2
(45) Date of Patent: Jul. 1, 2025

(54) MULTI-LAYER STRUCTURE

(71) Applicant: Nitto Denko Corporation, Ibaraki (JP)

(72) Inventors: Takeshi Murashige, Osaka (JP); Junichi Inagaki, Osaka (JP); Keisuke Sato, Osaka (JP); Atsushi Kishi, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 290 days.

(21) Appl. No.: 17/762,790

(22) PCT Filed: Sep. 17, 2020

(86) PCT No.: PCT/JP2020/035316
§ 371 (c)(1),
(2) Date: Mar. 23, 2022

(87) PCT Pub. No.: WO2021/060155
PCT Pub. Date: Apr. 1, 2021

(65) Prior Publication Data
US 2022/0347977 A1    Nov. 3, 2022

(30) Foreign Application Priority Data

Sep. 26, 2019 (JP) .................................. 2019-175837

(51) Int. Cl.
*B32B 15/04* (2006.01)
*B32B 1/08* (2006.01)
(Continued)

(52) U.S. Cl.
CPC .......... *B32B 17/10761* (2013.01); *B32B 1/08* (2013.01); *B32B 7/12* (2013.01);
(Continued)

(58) Field of Classification Search
CPC .................................................. B32B 2250/42
(Continued)

(56) References Cited

U.S. PATENT DOCUMENTS 5,498,458 A * 3/1996 Kleinke .................. B32B 29/02
52/794.1
8,497,006 B2 * 7/2013 Tomamoto ........... B65D 85/672
242/160.3
(Continued)

FOREIGN PATENT DOCUMENTS

CN     102548926 A    7/2012
CN     104395071 A    3/2015
(Continued)

OTHER PUBLICATIONS

Office Action dated Dec. 28, 2022, issued in counterpart CN Application No. 202080066849.2, with English translation. (16 pages).
(Continued)

*Primary Examiner* — Lauren R Colgan
(74) *Attorney, Agent, or Firm* — WHDA, LLP

(57) ABSTRACT

A multi-layer structure includes a glass layer having a thickness of greater than or equal to 10 μm and less than or equal to 200 μm; and a resin layer. A number of unit lamination structures in a thickness direction of the multi-layer structure is greater than or equal to 5 and less than or equal to 20,000, the unit lamination structure being a lamination structure composed of the glass layer and the resin layer.

6 Claims, 11 Drawing Sheets

(51) Int. Cl.
  *B32B 7/12* (2006.01)
  *B32B 17/06* (2006.01)
  *B32B 17/10* (2006.01)

(52) U.S. Cl.
  CPC ..... *B32B 17/10009* (2013.01); *B32B 17/1055* (2013.01); *B32B 2250/05* (2013.01); *B32B 2250/42* (2013.01); *B32B 2307/732* (2013.01)

(58) Field of Classification Search
  USPC .................................................. 428/426, 428
  See application file for complete search history.

(56) References Cited

U.S. PATENT DOCUMENTS

| | | | | |
|---|---|---|---|---|
| 9,908,730 | B2* | 3/2018 | Ortner | B32B 17/065 |
| 9,931,816 | B2* | 4/2018 | Tomamoto | B65H 18/28 |
| 10,562,727 | B2* | 2/2020 | Teranishi | C03B 17/06 |
| 10,618,837 | B2* | 4/2020 | Schuh | C03C 17/28 |
| 10,730,792 | B2* | 8/2020 | Ottermann | B65D 85/676 |
| 10,781,036 | B2* | 9/2020 | Tomamoto | B65D 85/48 |
| 2010/0028585 | A1* | 2/2010 | Shimatani | B32B 17/10045 |
| | | | | 428/215 |
| 2010/0260964 | A1* | 10/2010 | Nakamura | C03B 17/064 |
| | | | | 242/160.4 |
| 2011/0155303 | A1* | 6/2011 | Hansen | B32B 37/223 |
| | | | | 264/210.1 |
| 2011/0177325 | A1* | 7/2011 | Tomamoto | B32B 17/10 |
| | | | | 65/193 |
| 2011/0200812 | A1* | 8/2011 | Tomamoto | B65H 18/28 |
| | | | | 242/160.4 |
| 2011/0217521 | A1* | 9/2011 | Teranishi | B32B 3/02 |
| | | | | 428/192 |
| 2012/0183756 | A1* | 7/2012 | Higuchi | B32B 17/10798 |
| | | | | 156/306.9 |
| 2013/0196163 | A1* | 8/2013 | Swanson | B32B 7/06 |
| | | | | 156/199 |
| 2015/0174861 | A1* | 6/2015 | Hasegawa | B32B 17/10752 |
| | | | | 428/339 |
| 2016/0082705 | A1* | 3/2016 | Fisher | B32B 37/06 |
| | | | | 156/99 |
| 2017/0165938 | A1* | 6/2017 | Hirota | B32B 27/285 |
| 2020/0156350 | A1 | 5/2020 | Weber et al. | |

FOREIGN PATENT DOCUMENTS

| | | |
|---|---|---|
| JP | 2003-192402 A | 7/2003 |
| JP | 2011-225777 A | 11/2011 |
| JP | 2015-131753 A | 7/2015 |
| TW | M545043 U | 7/2017 |
| WO | 2011/037135 A1 | 3/2011 |
| WO | 2018215199 A1 | 11/2018 |

OTHER PUBLICATIONS

Extended (Supplementary) European Search Report dated Oct. 10, 2022, issued in counterpart EP application No. 20868066.0. (6 pages).
Office Action dated Jul. 20, 2023, issued in counterpart CN Application No. 202080066849.2, with English translation. (11 pages).
Office Action dated Dec. 20, 2023, issued in counterpart CN Application No. 202080066849.2, with English translation. (10 pages).
Office Action dated Apr. 25, 2023, issued in counterpart JP application No. 2019-175837, with English translation. (5 pages).
Office Action dated Sep. 13, 2022, issued in counterpart JP application No. 2019-175837, with English translation. (6 pages).
Extended (Supplementary) European Search Report dated Oct. 19, 2022, issued in counterpart application No. 20868066.0. (6 pages).
International Search Report dated Nov. 2, 2020, issued in counterpart International Application No. PCT/JP2020/035316, w/English translation (5 pages).
Office Action dated May 8, 2024, issued in counterpart TW application No. 109132778, with English translation. (7 pages).
Office Action dated Jul. 2, 2024, issued in counterpart JP Application No. 2023-120378, with English translation. (7 pages).
Office Action dated Mar. 24, 2025, issued in counterpart CN Applcation No. 202080066849.2, with English translation. (16 pages).

* cited by examiner

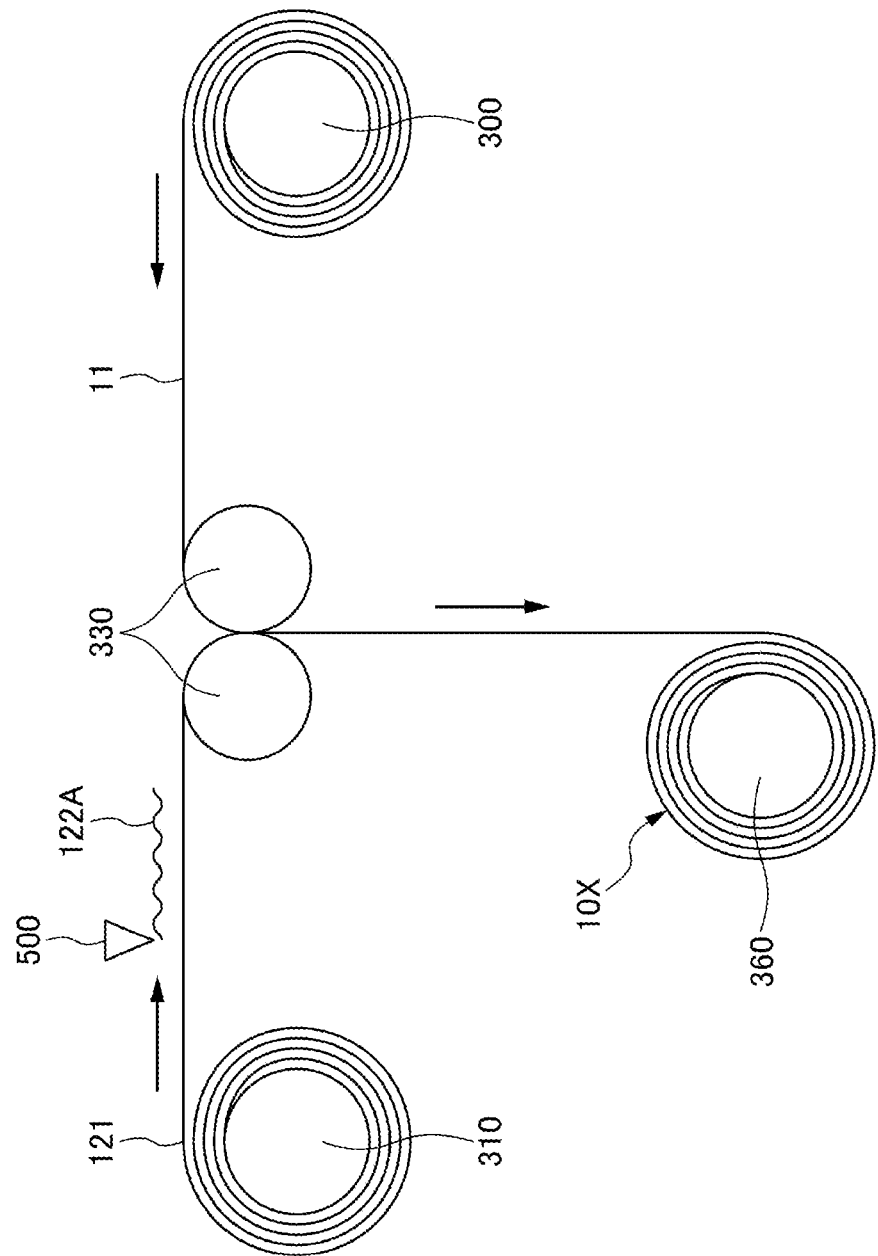

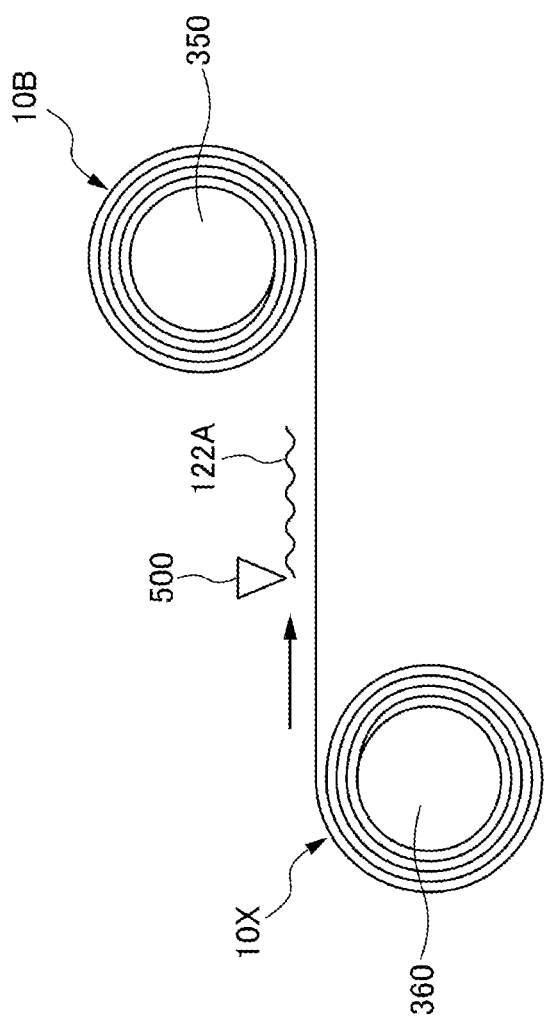

MULTI-LAYER STRUCTURE

TECHNICAL FIELD

The present invention relates to a multi-layer structure having a glass layer and a resin layer.

BACKGROUND ART

Multi-layer structures in which a plurality of layers of glass and resin films are laminated have been known as composite materials provided with both rigidity of glass and toughness of resin. The multi-layer structures have an effect of rapidly reducing an external impact by repeating breaking of glass and impact absorbing by resin in response to the high-intensity impact. According to the above-described features, the multi-layer structures have been widely used for a bulletproof glass or as a secure glass for preventing crack breakage against an external impact.

CITATION LIST

Patent Literature

PTL 1: Japanese Unexamined Patent Application Publication No. 2003-192402

SUMMARY OF INVENTION

Problem to be Solved by the Invention

In the conventional multi-layer structure, a plurality of sheets of flat glass each having a thickness of several millimeters are used. As the number of layers increases, an impact resistance is enhanced. However, due to a large specific gravity of glass, a large weight of the multi-layer structure is a problem. In order to broaden the usage scenario of glass, curved glass is used for showcases and construction members from the viewpoint of design. However, in order to apply the multi-layer structure to the curved glass, the multi-layer structure is required to be thermally deformed into a curved shape. At the glass softening point of several hundred degrees, a resin layer gets pyrolyzed, and the thermal deformation is not practical. There are methods of forming a curved glass surface in advance and laminating it with resin, but it is difficult to obtain high productivity.

In addition, if it is possible to obtain a cylinder of multi-layer structure, such a cylinder can be utilized as a high-strength piping material, and transparent and visible piping, which is less likely to break, can be provided to chemical plants or the like, in which metal piping subjected to glass treatment on surfaces thereof have been used. However, it is difficult to fabricate a tube having a surface on which a plurality of glass layers and a plurality of resin layers are laminated.

The present invention has been made in view of the above-described problem, and aims at providing a multi-layer structure which has a multi-layered composite structure of a glass layer and a resin layer, and can be deformed into a desired shape.

Means for Solving the Problem

According to an aspect of the present disclosure, a multi-layer structure includes a glass layer having a thickness of greater than or equal to 10 μm and less than or equal to 200 μm; and a resin layer, a number of unit lamination structures in a thickness direction of the multi-layer structure being greater than or equal to 5 and less than or equal to 20,000, and the unit lamination structure being a lamination structure composed of the glass layer and the resin layer.

Effects of the Invention

According to the technique disclosed in the present disclosure, a multi-layer structure which has a multi-layer composite structure of a glass layer and a resin layer and can be deformed into a desired shape, can be provided.

BRIEF DESCRIPTION OF DRAWINGS

FIG. 9A is a diagram illustrating a third example of the method of manufacturing the multi-layer structure in which the resin layer includes a resin film and a bonding layer.

FIG. 9B is a diagram illustrating a fourth example of the method of manufacturing the multi-layer structure in which the resin layer includes a resin film and a bonding layer.

MODE FOR CARRYING OUT THE INVENTION

Figure 1:
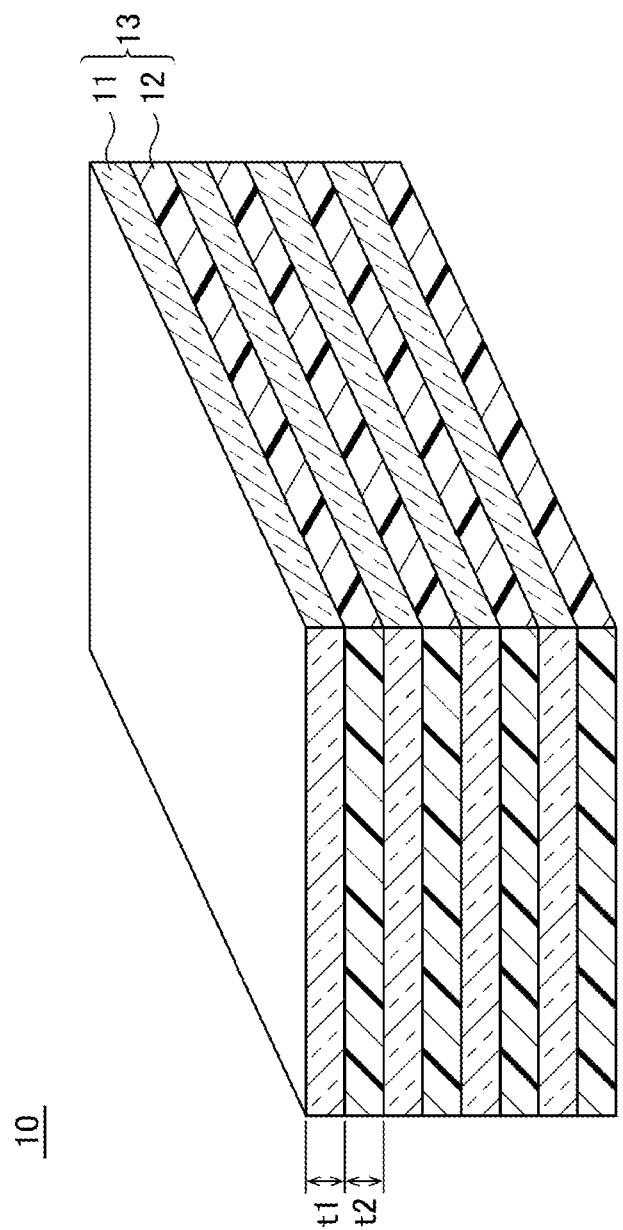
FIG. 1 is a perspective view illustrating an example of a multi-layer structure according to an embodiment.

Hereinafter, an embodiment for carrying out the invention will be described. In each drawing, to the same elements, the same reference numeral will be assigned, and a redundant explanation may be omitted.

[Multi-Layer Structure]

FIG. 1 is a perspective view illustrating an example of a multi-layer structure according to the present embodiment. As shown in FIG. 1, the multi-layer structure 10 has a structure in which the glass layer 11 and the resin layer 12 are alternately arranged in multiple layers.

More specifically, in the multi-layer structure 10, a single glass layer 11 and a single resin layer 12 are laminated to form a unit lamination structure 13, and a plurality of unit lamination structures 13 are laminated in a thickness direction (lamination direction) of the multi-layer structure 10, so that the glass layers 11 and the resin layers 12 are arranged alternately, and fixed. The unit lamination structures 13 may be laminated with each other via a bonding layer or an adhesive layer.

In the unit lamination structure 13, for example, the glass layer 11 and the resin layer 12 have the same thickness. However, the thickness of the glass layer 11 and the thickness of the resin layer 12 may be different from each other in the unit lamination structure 13. Moreover, a plurality of types of unit lamination structures 13 having different thicknesses in which the thickness of the glass layer 11 and the thickness of the resin layer 12 are freely-determined may be combined.

In the present embodiment, a number of the unit lamination structures 13 is from 5 to 20,000, preferably from 10 to 1000, and more preferably from 20 to 100. When the number falls within the above-described ranges, it is possible to obtain a multi-layer structure 10 provided with features of a light weight and an impact resistance. For convenience of preparing drawings, the number of the unit lamination structures 13 may be less than five in each drawing, but actually, the number of the unit lamination structures 13 is greater than or equal to five and less than or equal to 20000.

Figure 2:
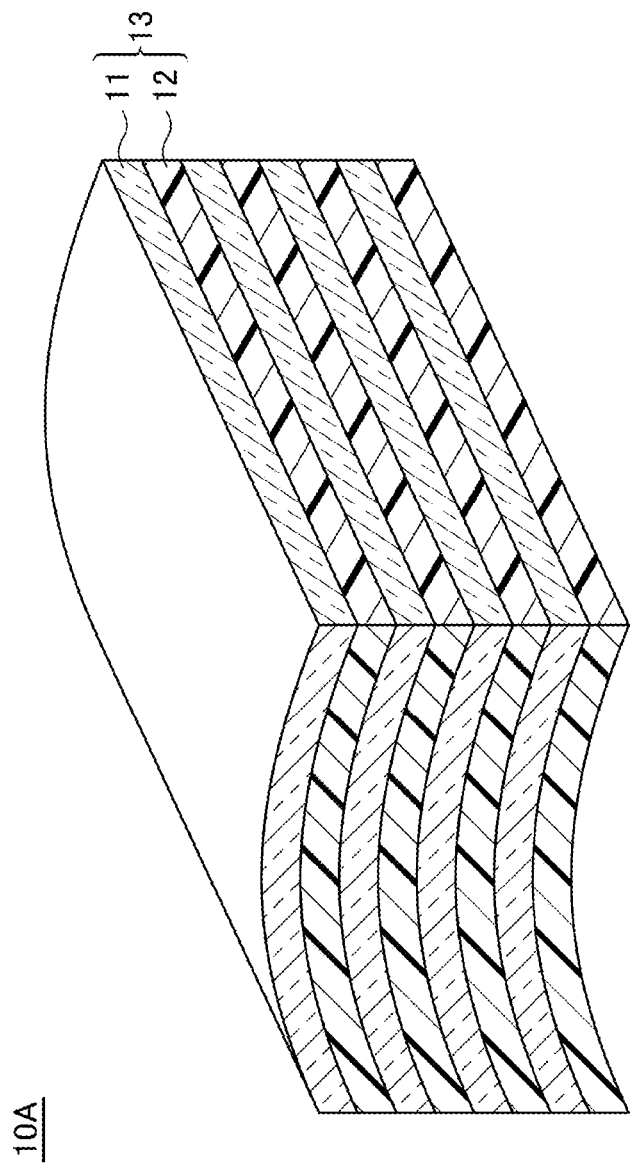
FIG. 2 is a perspective view illustrating an example of a multi-layer structure according to a first variation of the embodiment.

FIG. 2 is a perspective view illustrating an example of a multi-layer structure according to a first variation of the present embodiment. As the multi-layer structure 10 shown in FIG. 1, the main surfaces of the glass layer 11 and the resin layer 12 may be flat, or the main surfaces of the glass layer 11 and the resin layer 12 may be a curved surface, as a multi-layer structure 10A shown in FIG. 2. Alternatively, in the multi-layer structure according to the embodiment, a portion in which the main surfaces of the glass layer 11 and the resin layer 12 are flat and a portion in which the main surfaces are curved may be combined.

Figure 3:
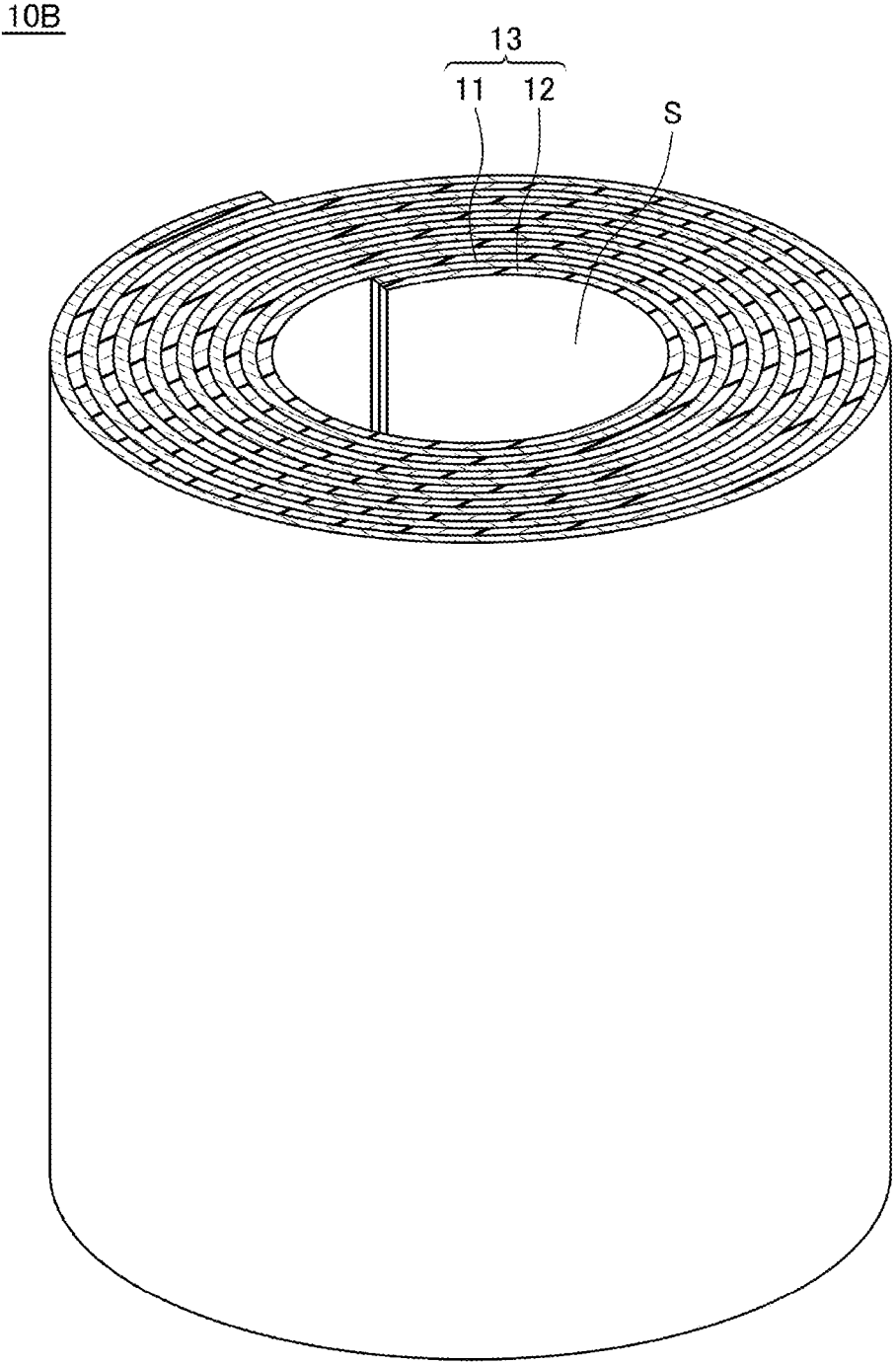
FIG. 3 is a perspective view illustrating an example of a multi-layer structure according to a second variation of the embodiment.

FIG. 3 is a perspective view illustrating an example of a multi-layer structure according to a second variation of the present embodiment. As a multi-layer structure 10B illustrated in FIG. 3, when the unit lamination structures 13 are laminated so as to form a roll, it is possible to form the multi-layer structure typically having a cylindrical shape. In FIG. 3, a portion indicated by the symbol S near the center of the multi-layer structure 10B represents a vacant space.

Figure 4A:
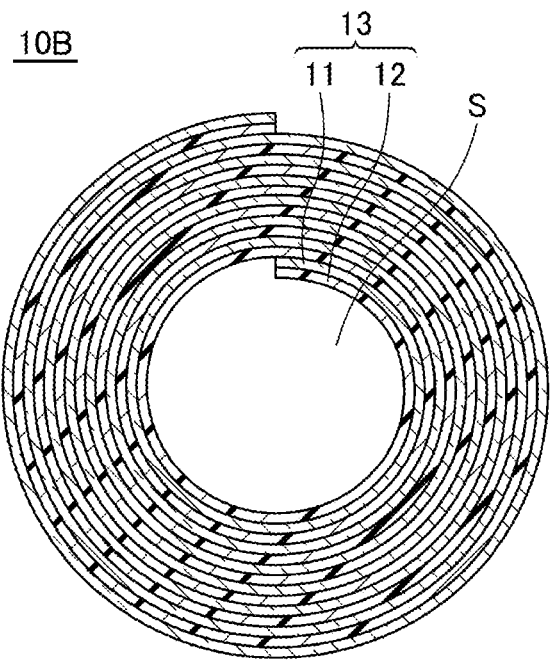
FIG. 4A is a cross-sectional view illustrating a first example of a shape of a cross section of the multi-layer structure according to the embodiment.
Figure 4B:
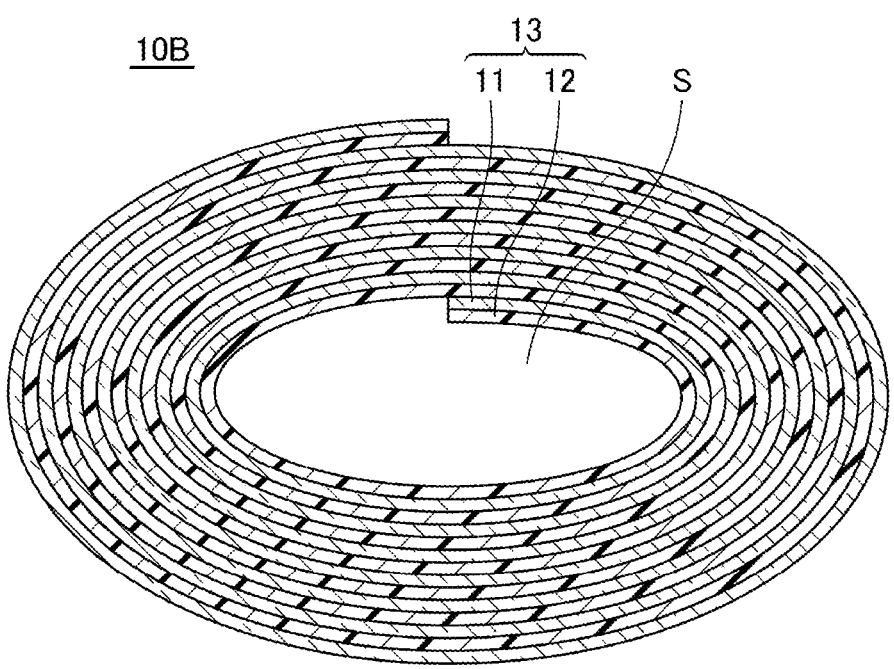
FIG. 4B is a cross-sectional view illustrating a second example of the shape of the cross section of the multi-layer structure according to the embodiment.
Figure 4C:
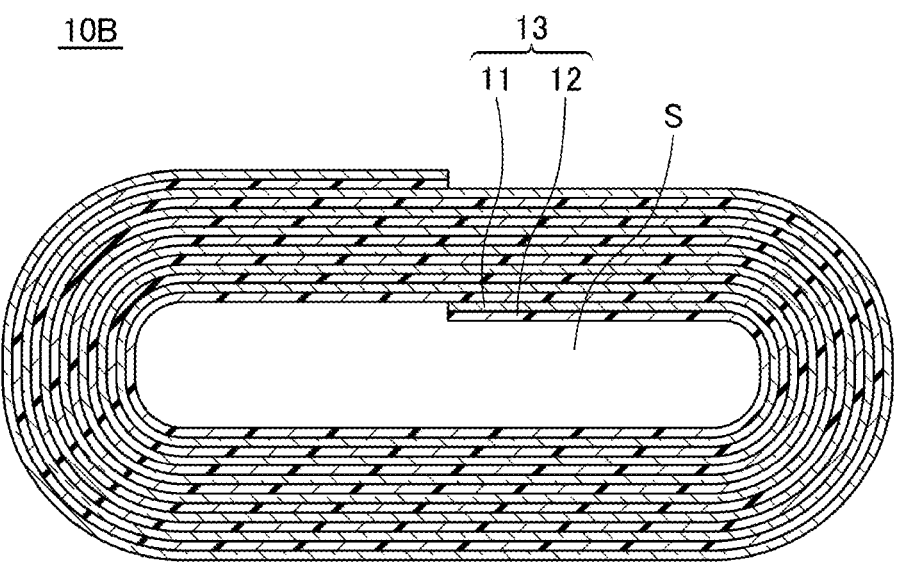
FIG. 4C is a cross-sectional view illustrating a third example of the shape of the cross section of the multi-layer structure according to the embodiment.
Figure 4D:
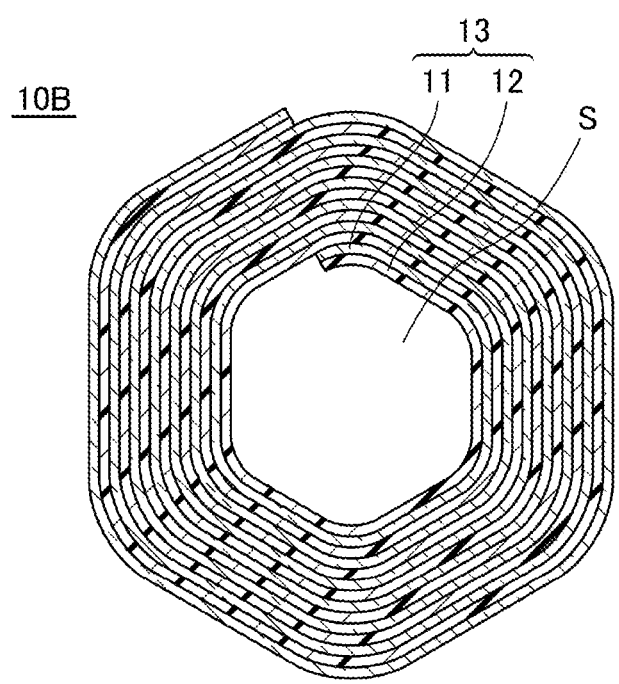
FIG. 4D is a cross-sectional view illustrating a fourth example of the shape of the cross section of the multi-layer structure according to the embodiment.

A cross section, obtained by transversely cutting a columnar structure of the multi-layer structure 10B, has, for example, a shape of a circle, as shown in FIG. 4A. However, the shape of the cross section of the columnar structure of the multi-layer structure 10B is not limited to a circle, and may be an ellipse, as shown in FIG. 4B, or a combination of straight lines and curves, as shown in FIG. 4C and FIG. 4D. The example of the shape of the cross section shown in FIG. 4C is a rounded rectangle, and the example of the shape of the cross section shown in FIG. 4D is a rounded hexagon.

[Glass Layer]

The glass layer 11 is not particularly limited. An appropriate material may be used in accordance with the purpose. Examples of the glass layer 11 include soda lime glass, borate glass, aluminosilicate glass, and quartz glass, according to the composition classification. Also, according to the classification by an alkali component, alkali-free glass or low alkali glass may be included. The content of an alkali metal component of the above-described glass (e.g., $Na_2O$, $K_2O$, $Li_2O$) is preferably 15% or less by weight, and more preferably 10% or less by weight.

A thickness t1 of the glass layer 11 is, for example, greater than or equal to 10 μm and less than or equal to 200 μm. Here, a glass layer having a thickness of from 10 μm to 200 μm means that an average of the thickness of the glass layer falls within a range from 10 μm to 200 μm.

The thickness t1 of the glass layer 11 is preferably 10 μm or more in consideration of surface hardness, airtightness, and corrosion resistance of glass. Also, in order to obtain a curved structure, it is desirable that the single glass layer 11 be flexible, such as a film, and thus the thickness t1 of the glass layer 11 is preferably 200 μm or less, and especially preferably from 50 μm to 100 μm.

The light transmittance of the glass layer 11 at a wavelength of 550 nm is preferably 85% or more. The refractive index of the glass layer 11 at a wavelength of 550 nm is preferably from 1.4 to 1.65. The density of the glass layer 11 is preferably from 2.3 $g/cm^3$ to 3.0 $g/cm^3$, and more preferably from 2.3 $g/cm^3$ to 2.7 $g/cm^3$.

The method of forming the glass layer 11 is not particularly limited, and a suitable method may be employed in accordance with the purpose. Typically, the glass layer 11 can be made by melting a mixture containing a main raw material, such as silica or alumina, a defoaming agent, such as sodium sulfate or antimony oxide, and a reducing agent, such as carbon, at a temperature of about from 1400° C. to 1600° C., forming the mixture into a sheet shape, and cooling the sheet. Examples of the forming method of the glass layer 11 include a slot down draw method, a fusion method, and a float method. The glass layer formed into a sheet shape according to the above-described methods may be chemically polished with a solvent such as fluoric acid, as necessary, to prow de a thin plate or to enhance smoothness.

[Resin Layer]

Figure 5A:
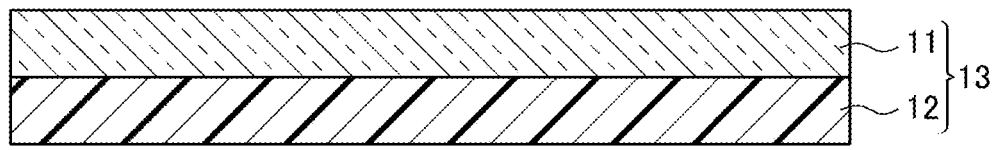
FIG. 5A is a cross-sectional view illustrating a first example of a structure of a resin layer of the multi-layer structure according to the embodiment.

In the present application, a resin layer refers to a layer including a resin component. The resin layer may contain additives such as inorganic particles to form the resin layer. Specifically, a layer composed only of a bonding layer, an adhesive layer, or an interlayer film corresponds to a resin layer. FIG. 5A shows an example in which the resin layer 12 is composed only of a bonding layer, an adhesive layer, or an interlayer film.

Figure 5B:
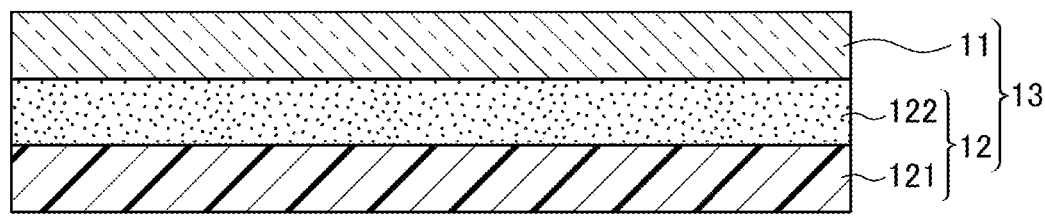
FIG. 5B is a cross-sectional view illustrating a second example of the structure of the resin layer of the multi-layer structure according to the embodiment.

When a flexible resin film and a glass layer are laminated via a bonding layer or an adhesive layer, the layer having the resin film and the bonding layer or the adhesive layer corresponds to the resin layer. That is, in the unit lamination structure, the resin layer may have a flexible resin film and a bonding layer or an adhesive layer disposed between the glass layer and the resin film. FIG. 5B illustrates an example in which the resin layer 12 is composed of a resin film 121 and a bonding layer 122. The resin layer 12 may have an adhesive layer in place of the bonding layer 122.

A thickness t2 of the resin layer 12 is, for example, from 0.1 μm to 2 mm. Here, a resin layer having a thickness of from 0.1 μm to 2 mm means that an average of the thickness of the resin layer falls within a range from 0.1 μm to 2 mm.

[Resin Film]

Examples of the flexible resin base material include polyethersulfone-based resins; polycarbonate-based resins; acrylic-based resins; polyester-based resins, such as polyethylene terephthalate-based resins and polyethylene naphthalate-based resins; polyolefin-based resins; cycloolefin-based resins, such as norbornene-based resins; polyimide-based resins; polyamide-based resins; polyimideamide-based resins; polyarylate-based resins; polysulfone-based resins; and polyetherimide-based resins. Among them, polyethylene terephthalate, polycarbonate, and polyolefin are preferably used. The color of the resin base material is not particularly limited, but the resin base materials that are opaque are not preferred from the viewpoint of transparency. A thickness of the resin film is preferably from 25 μm to 1 mm, and especially preferably from 50 μm to 500 μm.

[Bonding Agent, Adhesive Agent, Interlayer Film]

Any suitable bonding agent or adhesive agent is used for the bonding agent or the adhesive agent. Specifically, examples of the bonding agent or the adhesive agent include an acrylic-based adhesive agent, a silicone-based adhesive agent, a rubber-based adhesive agent, an ultraviolet-curable acrylic-based bonding agent, an ultraviolet-curable epoxy-based bonding agent, a thermosetting epoxy-based bonding agent, a thermosetting melamine-based bonding agent, and a thermosetting phenol-based bonding agent.

Further, for the interlayer film, an interlayer film of ethylene vinyl acetate (EVA); an interlayer film of a polyvinyl acetal-based such as polyvinyl butyral (PVB); an interlayer film of a polyvinyl halide-based resin such as polyvinyl chloride (PVC), or the like can be used. Thicknesses of the bonding layer, the adhesive layer, and the interlayer film are not particularly limited within the range of the thickness of the resin layer.

[Method for Manufacturing Multi-Layer Structures]
(When the Resin Layer 12 is Composed Only of a Bonding Layer, an Adhesive Layer, or an Interlayer Film)

Figure 6:
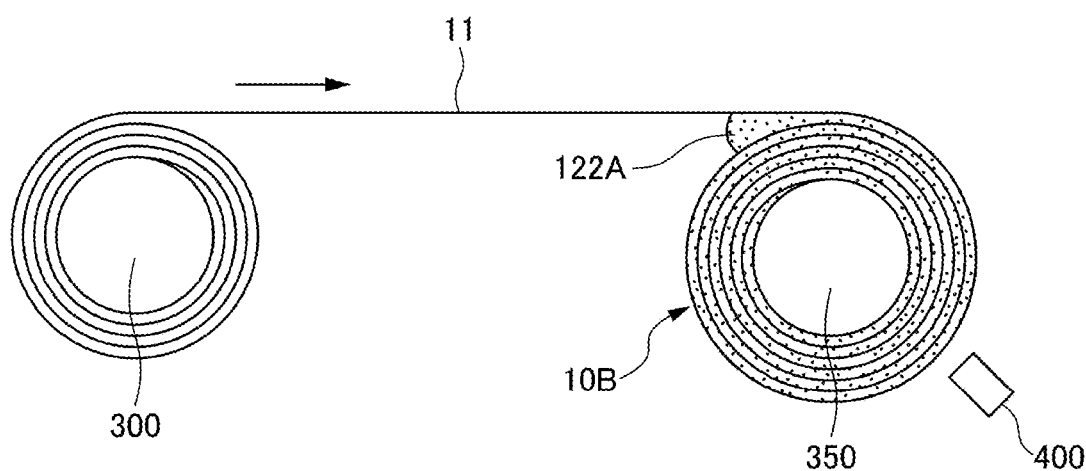
FIG. 6 is a diagram illustrating an example of a method of manufacturing the multi-layer structure in which the resin layer is composed only of a bonding layer.

FIG. 6 is a diagram illustrating a method of manufacturing a multi-layer structure in which a resin layer is composed only of a bonding layer. If the resin layer 12 is composed only of a bonding layer, the multi-layer structure 10B can be manufactured, for example, by the method shown in FIG. 6. Even when the resin layer 12 is composed only of an adhesive layer or an interlayer film, the multi-layer structure 10B can be manufactured by the same method as that shown in FIG. 6.

Specifically, while a glass layer 11 wound on the feed roll 300 being sent from the feed roll 300 in a direction of an arrow in FIG. 6, a bonding agent 122A is laminated on one side of the glass layer 11, and the glass layer 11 is wound onto a winding roll 350 having a desired inner diameter. If the bonding agent 122A is liquid, the bonding agent 122A is cured using a curing device 400 to form a resin layer 12. The curing device 400 may be, for example, an ultraviolet radiator or a heating device. Thereafter, by removing the winding roll 350, a multi-layer structure 10B is obtained, in which there are a desired number of layers of the unit lamination structure 13, i.e., a lamination structure of the glass layer 11 and the resin layer 12. The resin layer 12 is composed of a bonding layer which is the cured bonding agent 122A.

When an interlayer film, such as EVA or PVB, is used as the resin layer 12, it is preferable that the interlayer film be wound by the winding roll 350 while heating the interlayer film.

In addition, when the resin layer 12 is composed only of an interlayer film, the multi-layer structure 10B can be also formed by thermo compression bonding the surface on the interlayer film side of the unit lamination structure 13, having the glass layer 11 and the resin layer 12, to the surface on the glass layer 11 side of another unit lamination structure 13. In principle, the multi-layer structure 10B can be fabricated by increasing the temperature of the unit lamination structure 13 to a temperature at which the glass layer 11 and the interlayer film can be bonded during lamination.

For example, the method for increasing the temperature includes a method in which a roll heated simultaneously with the lamination or after the lamination is pressed against the outermost layer to be compression bonded to the outermost layer when the multi-layer structure 10B of any columnar shape (cylindrical) is fabricated. In addition, when a sheet of the unit lamination structure 13, in which the glass layer 11 and the interlayer film are laminated, in advance is fabricated, the sheet of the unit lamination structure 13 can be obtained by increasing the temperature of the lamination roll. Another method for obtaining the unit lamination structure 13 may include, for example, once winding the glass layer 11 and the interlayer film, placing the roll under vacuum, and increasing the temperature using infrared rays or the like, to bond the glass layer and the interlayer film.

(When the Resin Layer 12 is Composed of a Resin Film and a Bonding Layer or an Adhesive Layer)

Figure 7:
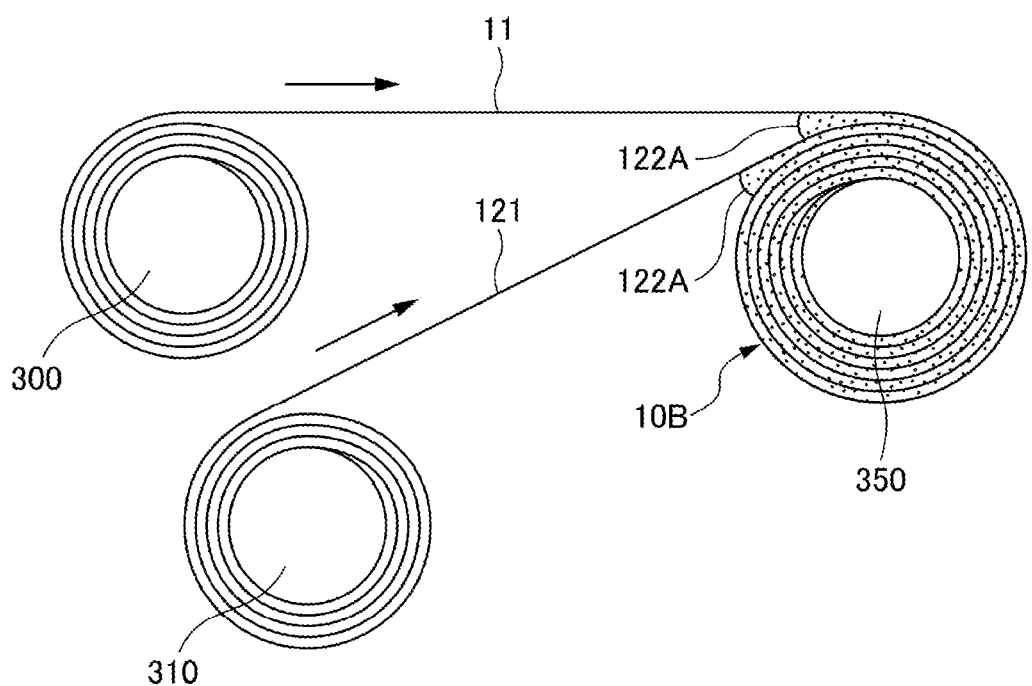
FIG. 7 is a diagram illustrating a first example of a method of manufacturing the multi-layer structure in which the resin layer includes a resin film and a bonding layer.

FIG. 7 is a diagram illustrating a method of manufacturing a multi-layer structure in which a resin layer is composed of a resin film and a bonding layer. When the resin layer 12 is composed of a resin film and a bonding layer, the multi-layer structure 10B can be manufactured, for example, by the method shown in FIG. 7. Even when the resin layer 12 is composed of a resin film and an adhesive layer, the multi-layer structure 10B can be manufactured by the same method as shown in FIG. 7.

Specifically, while a glass layer 11 wound on the feed roll 300 and a resin film 121 wound on the feed roll 310 are being sent from the feed roll 300 and the feed roll 310 in directions of arrows in FIG. 7, a bonding agent 122A is laminated on both sides of the resin film 121, and the glass layer 11 and the resin film 121 are wound onto the winding roll 350 having a desired inner diameter. Thereafter, by removing the winding roll 350, a multi-layer structure 103 is obtained, in which there are a desired number of layers of the unit lamination structure 13, i.e., a lamination structure of the glass layer 11 and the resin layer 12. The resin layer 12 is composed of the resin film 121 and a bonding layer 122 which is the cured bonding agent 122A.

Figure 8:
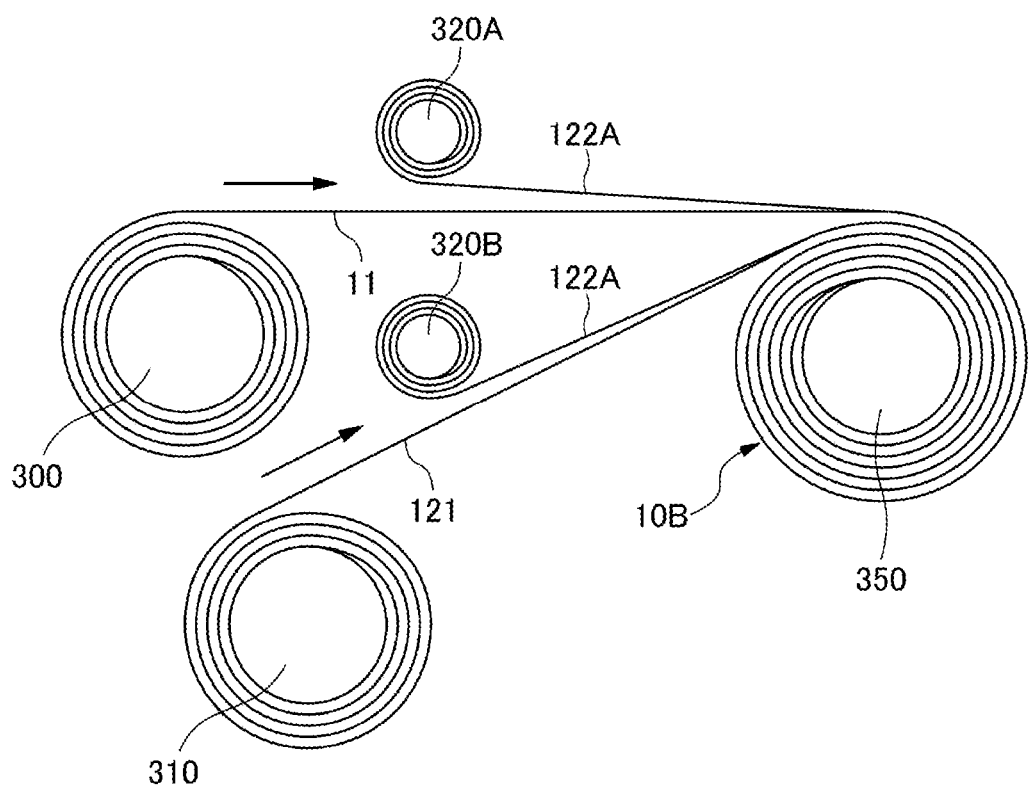
FIG. 8 is a diagram illustrating a second example of the method of manufacturing the multi-layer structure in which the resin layer includes a resin film and a bonding layer.

In addition, instead of the method of laminating the bonding agent 122A on both surfaces of the resin film 121, a method of laminating the bonding agent 122A on one side of the glass layer 11 and on one side of the resin film 121, as shown in FIG. 8, may be used. In FIG. 8, film-like bonding agent 122A wound on feed rolls 320A and 320B is fed to one side of the glass layer 11 and to one side of the resin film 121.

Furthermore, the following methods may also be used.

First, as shown in FIG. 9A, while a glass layer 11 wound on the feed roll 300 and a resin film 121 wound on the feed roll 310 are being sent from the feed roll 300 and the feed roll 310 in directions of arrows in FIG. 9A, a bonding agent 122A is laminated on one side of the resin film 121 using a coater 500, and the glass layer 11 and the resin film 121 are wound onto the winding roll 360 through nip rolls 330. Thus, a composite roll 10X in which the glass layer 11 and the resin film 121 are laminated via the bonding agent 122A is fabricated.

Next, as shown in FIG. 9B, while a sheet is being sent from the composite roll 10X in a direction of an arrow in FIG. 9B, a bonding agent 122A is laminated on one side of the resin film 121 using the coater 500, and the sheet is wound onto a winding roll 350 having a desired inner diameter. Thereafter, by removing the winding roll 350, a multi-layer structure 10B is obtained, in which there are a desired number of layers of the unit lamination structure 13, i.e., a lamination structure of the glass layer 11 and the resin layer 12. In this case, the unit lamination structures 13 are laminated via bonding layers with respect to each other. In FIG. 9B, the bonding agent 122A may be laminated on both sides of the resin film 121.

Note that in any of the methods shown in FIGS. 6 to 9B, the bonding agent that requires curing needs to be cured by heat or light while winding or after the winding. A liquid bonding agent may be applied to the resin film 121 using the coater 500 to laminate the resin film, as shown in FIGS. 9A and 9B. Alternatively, a liquid pool may be prepared in the winding portion, and a layer of a bonding agent may be formed simultaneously with the winding, as shown in FIG. 7.

In any of the methods shown in FIGS. 6 to 9B, the thickness of the multi-layer structure 10B can be controlled by the number of windings. The inner diameter of the multi-layer structure 10B can be freely controlled by selecting an outer diameter of the winding roll 350.

When two or more types of multi-layer structures are combined, a laminate formed of multi-layer structures different from each other between the inner side and outer side of a cylinder can be fabricated, for example, by winding up a multi-layer structure by the above-described method and further winding up a film made of different material or with a different thickness from that of the multi-layer structure thereon. In this case, it is possible to incorporate a configuration in which only a resin film that does not contain glass is wound up via a bonding agent.

The multi-layer structure 10B typically has a shape of a cylinder. However, by changing a shape of the winding roll 350, multi-layer structures 10B in various shapes as shown in FIGS. 4A to 4D can be fabricated.

Figure 10:
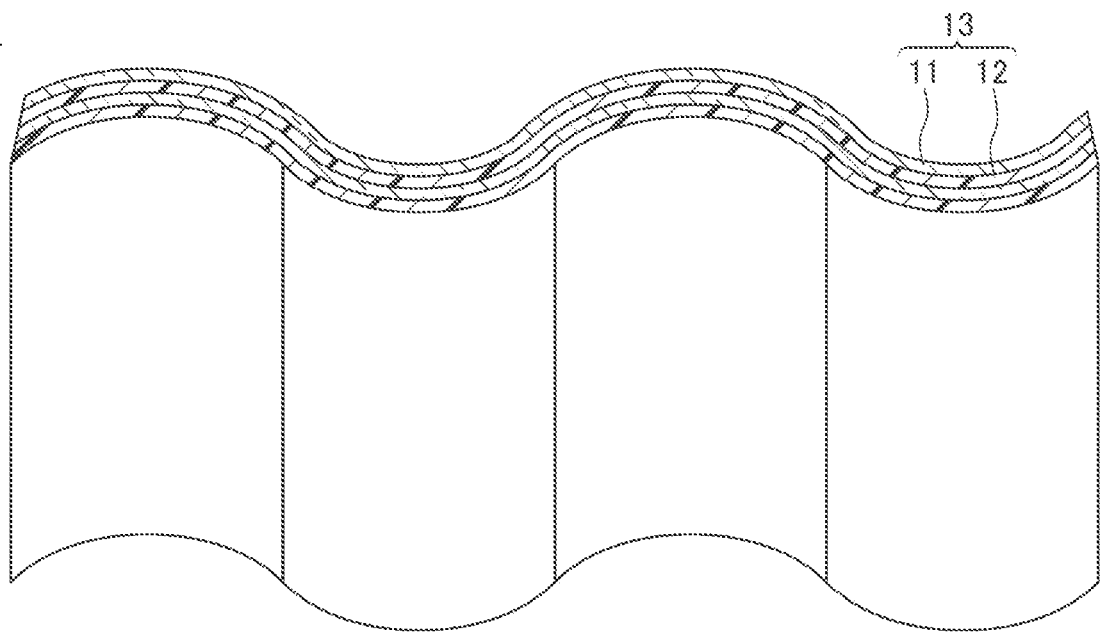
FIG. 10 is a perspective view illustrating a first example of cutting a columnar structure of the multi-layer structure according to the embodiment.
Figure 11:
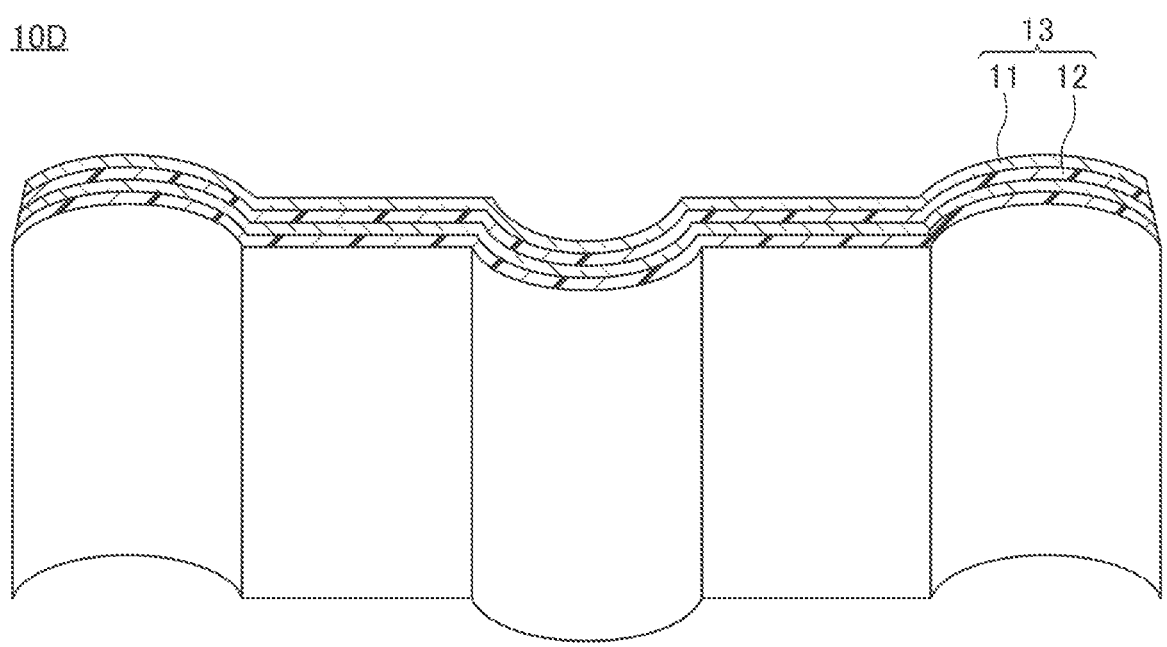
FIG. 11 is a perspective view illustrating a second example of cutting the columnar structure of the multi-layer structure according to the embodiment.

Further, by cutting the columnar structure of the multi-layer structure 10B, a board with a surface having a semi-circular shape or a freely-determined curved shape, such as a board 10C shown in FIG. 10 or a board 10D shown in FIG. 11, can be obtained. By combining the boards 10C and 10D, a variety of three-dimensional structures can be created. In addition, by cutting the columnar structure of the multi-layer structure 10B, a multi-layer structure 10 as shown in FIG. 1 or a multi-layer structure 10A as shown in FIG. 2 can be fabricated.

[Applications]

The multi-layer structure according to the embodiment of the present application can be applied to, for example, industrial piping, building materials, showcases, and curved windows.

As described above, the multi-layer structure according to the embodiment of the present application is a multi-layer structure having a glass layer with a thickness of greater than or equal to 10 µm and less than or equal to 200 µm; and a resin layer, a number of unit lamination structures in a thickness direction of the multi-layer structure being greater than or equal to 5 and less than or equal to 20000, and the unit lamination structure being a lamination structure composed of the glass layer and the resin layer. Thus, the multi-layer structure according to the embodiment of the present application is light weight while forming a multi-layered composite structure of a glass layer and a resin layer that can absorb a high-intensity impact, and can be formed into a desired shape, i.e., not only a flat surface but also a curved surface and a cylindrical shape.

As described above, preferred embodiments of the present invention have been described in detail. The present invention is not limited to the embodiments or the like. Various variations and replacements may be made for the above-described embodiments without departing from the scope recited in claims.

The present international application claims the priority based on Japanese Patent Application No. 2019-175837, filed Sep. 26, 2019, and the entire content of Japanese Patent Application No. 2019-175837 is incorporated herein by reference.

REFERENCE SIGNS LIST 10, 10A, 10B Multi-layer structure
10C, 10D Board
11 Glass layer
12 Resin layer
13 Unit lamination structure
121 Resin film
122 Bonding layer
122A Bonding agent

The invention claimed is:

1. A multi-layer structure comprising:
   unit lamination structures, wherein each unit lamination structure of the unit lamination structures is a lamination structure composed of:
   a glass layer having a thickness of greater than or equal to 10 µm and less than or equal to 200 µm;
   a resin layer, the resin layer includes a flexible resin film, and
   a bonding layer or an adhesive layer provided between the resin film and the glass layer; and
   wherein a total number of unit lamination structure of the unit lamination structures in a thickness direction of the multi-layer structure is greater than or equal to 5 structures and less than or equal to 20,000 structures, and
   wherein a thickness of the resin layer of each unit lamination structure is in a range from more than 50 µm and up to 1 mm.

2. The multi-layer structure according to claim 1, wherein the multi-layer structure has a cylindrical shape.

3. The multi-layer structure according to claim 1, wherein one resin layer of one of the unit lamination structure of the unit lamination structures is composed of ethylene vinyl acetate.

4. The multi-layer structure according to claim 1, wherein one resin layer of one of the unit lamination structure of the unit lamination structures is composed of polyvinyl butyral.

5. The multi-layer structure according to claim 1, wherein the total number of unit lamination structure of the unit lamination structures in the thickness direction of the multi-layer structure is greater than or equal to 10 structures and less than or equal to 20,000 structures.

6. The multi-layer structure according to claim 1, wherein the total number of unit lamination structure of the unit lamination structures in the thickness direction of the multi-layer structure is greater than or equal to 20 structures and less than or equal to 20,000 structures.

* * * * *